US011970280B2

(12) United States Patent
Glemarec et al.

(10) Patent No.: US 11,970,280 B2
(45) Date of Patent: Apr. 30, 2024

(54) ASSEMBLY BETWEEN AN AIRCRAFT PYLON AND A TURBOMACHINE

(71) Applicant: SAFRAN AIRCRAFT ENGINES, Paris (FR)

(72) Inventors: Guillaume Glemarec, Moissy-Cramayel (FR); Guilhem Seize, Moissy-Cramayel (FR); Eric Francois Michel Maingre, Moissy-Cramayel (FR); Jean-Baptiste Vignes, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 157 days.

(21) Appl. No.: 17/757,870

(22) PCT Filed: Jan. 5, 2021

(86) PCT No.: PCT/FR2021/050007
§ 371 (c)(1),
(2) Date: Jun. 22, 2022

(87) PCT Pub. No.: WO2021/140294
PCT Pub. Date: Jul. 15, 2021

(65) Prior Publication Data
US 2023/0028982 A1 Jan. 26, 2023

(30) Foreign Application Priority Data
Jan. 10, 2020 (FR) ...................................... 2000245

(51) Int. Cl.
*B64D 27/40* (2024.01)
*F01D 25/28* (2006.01)

(52) U.S. Cl.
CPC ............. *B64D 27/40* (2024.01); *F01D 25/28* (2013.01); *B64D 27/404* (2024.01)

(58) Field of Classification Search
CPC ........ B64D 27/40; B64D 27/12; B64D 27/18; B64D 27/406; B64D 27/404; F01D 25/28
See application file for complete search history.

(56) References Cited

U.S. PATENT DOCUMENTS 3,948,226 A * 4/1976 Green ...................... F01C 9/00
  123/18 R
4,560,122 A * 12/1985 Parkinson .............. B64D 27/18
  244/54

(Continued)

FOREIGN PATENT DOCUMENTS

| FR | 3015434 A1 | 6/2015 |
| FR | 3039204 A1 | 1/2017 |
| FR | 3058127 A1 | 5/2018 |

OTHER PUBLICATIONS

International Search Report received for PCT Patent Application No. PCT/FR2021/050007, dated May 19, 2021, 5 pages (2 pages of English Translation and 3 pages of Original Document).

*Primary Examiner* — Medhat Badawi
(74) *Attorney, Agent, or Firm* — WOMBLE BOND DICKINSON (US) LLP (57) ABSTRACT

The invention relates to an assembly between an aircraft pylon (30) and a turbomachine (20) of longitudinal axis (X), the pylon (30) and the turbomachine (20) each comprising front and rear longitudinal regions, the assembly comprising a rear support (40) configured to connect the rear region of the turbomachine (20) to the rear region of the pylon (30), the assembly being characterized in that the rear support (40) comprises a sliding pivot connection arranged between the rear region of the turbomachine (20) and the rear region of the pylon (30), so as to allow the turbomachine (20) only translational and rotational movements along and about the longitudinal axis (X) and along and about a vertical axis (Z) and a rotational movement about a transverse axis (Y).

11 Claims, 8 Drawing Sheets

(56) References Cited

U.S. PATENT DOCUMENTS

| | | | | |
|---|---|---|---|---|
| 5,320,307 A * | 6/1994 | Spofford | B64D 27/18 | 60/797 |
| 5,351,930 A * | 10/1994 | Gwinn | B64D 27/40 | 244/54 |
| 5,746,391 A * | 5/1998 | Rodgers | B64D 27/18 | 248/556 |
| 5,806,792 A * | 9/1998 | Brossier | B64D 27/40 | 244/54 |
| 6,607,165 B1 * | 8/2003 | Manteiga | B64D 27/40 | 244/54 |
| 6,682,015 B2 * | 1/2004 | Levert | B64D 27/40 | 244/54 |
| 7,350,747 B2 * | 4/2008 | Machado | F02C 7/20 | 244/54 |
| 7,451,947 B2 * | 11/2008 | Machado | B64D 27/12 | 60/797 |
| 7,677,493 B2 * | 3/2010 | Diochon | B64D 27/40 | 244/54 |
| 7,740,200 B2 * | 6/2010 | Diochon | B64D 27/40 | 244/54 |
| 7,784,733 B2 * | 8/2010 | Diochon | B64D 27/40 | 244/54 |
| 7,963,479 B2 * | 6/2011 | Cazals | B64D 27/40 | 244/54 |
| 8,038,092 B2 * | 10/2011 | Diochon | B64D 27/40 | 244/54 |
| 8,152,094 B2 * | 4/2012 | Foster | B64D 27/40 | 244/54 |
| 8,226,028 B2 * | 7/2012 | Marche | B64D 27/12 | 244/54 |
| 8,511,605 B2 * | 8/2013 | Suciu | F01D 17/16 | 60/226.3 |
| 8,640,987 B2 * | 2/2014 | Journade | B64D 27/40 | 244/54 |
| 8,727,269 B2 * | 5/2014 | Stuart | B64D 27/18 | 60/797 |
| 9,211,955 B1 * | 12/2015 | Mauldin | B64C 7/02 | |
| 9,394,057 B2 * | 7/2016 | Guillou | B64D 27/40 | |
| 9,701,412 B2 * | 7/2017 | Stretton | B64D 27/40 | |
| 9,919,804 B2 * | 3/2018 | Pautis | B64D 27/18 | |
| 9,995,043 B2 * | 6/2018 | Bierman | E04F 11/1853 | |
| 10,029,801 B2 * | 7/2018 | Butcher | B64D 27/12 | |
| 10,144,526 B2 * | 12/2018 | Zameroski | G06F 11/3466 | |
| 11,242,805 B2 * | 2/2022 | Adams | F02K 3/075 | |
| 11,560,840 B2 * | 1/2023 | Schelfaut | F02C 7/00 | |
| 11,674,414 B2 * | 6/2023 | Gajowniczek | F01D 25/04 | 415/213.1 |
| 2004/0129832 A1 * | 7/2004 | Marche | B64D 27/18 | 244/54 |
| 2005/0082423 A1 * | 4/2005 | Whitmer | B64D 27/18 | 244/54 |
| 2005/0178888 A1 * | 8/2005 | Machado | B64D 27/40 | 244/54 |
| 2008/0042008 A1 * | 2/2008 | Diochon | B64D 27/40 | 244/54 |
| 2008/0067286 A1 * | 3/2008 | Cousin | B64D 27/12 | 244/54 |
| 2008/0067287 A1 * | 3/2008 | Guibert | B64D 27/40 | 244/54 |
| 2008/0217467 A1 * | 9/2008 | Lafont | B64D 27/18 | 244/54 |
| 2008/0223983 A1 * | 9/2008 | Lafont | B64D 27/40 | 244/54 |
| 2008/0296430 A1 * | 12/2008 | Combes | B64D 27/40 | 244/54 |
| 2008/0315033 A1 * | 12/2008 | Diochon | B64D 27/18 | 244/54 |
| 2009/0212155 A1 * | 8/2009 | Huggins | B64D 27/40 | 244/54 |
| 2009/0255271 A1 * | 10/2009 | Vauchel | B64D 29/00 | 60/797 |
| 2009/0320578 A1 * | 12/2009 | Peltzer | G01M 15/14 | 73/116.03 |
| 2010/0193627 A1 * | 8/2010 | Lafont | B64D 27/40 | 244/54 |
| 2011/0290934 A1 * | 12/2011 | Journade | F02C 7/20 | 244/54 |
| 2013/0233997 A1 * | 9/2013 | Suciu | B64D 27/40 | 248/554 |
| 2014/0102114 A1 * | 4/2014 | Demoulin | F02C 7/20 | 60/797 |
| 2014/0112770 A1 * | 4/2014 | Riviere | F02C 7/20 | 415/213.1 |
| 2015/0175268 A1 * | 6/2015 | Guillou | B64D 27/40 | 244/54 |
| 2016/0167798 A1 * | 6/2016 | Prentice | B64D 27/40 | 244/54 |
| 2017/0101895 A1 * | 4/2017 | Bellet | B64D 29/02 | |
| 2018/0230949 A1 * | 8/2018 | Kerbler | F02K 99/00 | |
| 2019/0168883 A1 * | 6/2019 | Buchholz | B64D 27/20 | |
| 2020/0189759 A1 * | 6/2020 | Auge | B64D 27/40 | |
| 2021/0323690 A1 * | 10/2021 | Garnaud | B64D 27/40 | |
| 2023/0028982 A1 * | 1/2023 | Glemarec | B64D 27/406 | |

* cited by examiner

ASSEMBLY BETWEEN AN AIRCRAFT PYLON AND A TURBOMACHINE

TECHNICAL FIELD

The present invention relates to the suspension of an aircraft turbomachine to an aircraft pylon.

PRIOR ART

The technical background comprises in particular the documents FR 3 039 204 A1 and US 2015/175268 A1.

In a conventional way, an aircraft turbomachine, for example of the turbojet engine type, comprises from upstream to downstream in the flow direction of the gases, a fan, at least one compressor, a combustion chamber, and at least one turbine. Each element of the turbomachine is generally surrounded by a casing, such as a fan casing surrounding the fan, a turbine casing surrounding the turbine or the turbines, and an exhaust casing arranged downstream of the turbine.

Figure 1:
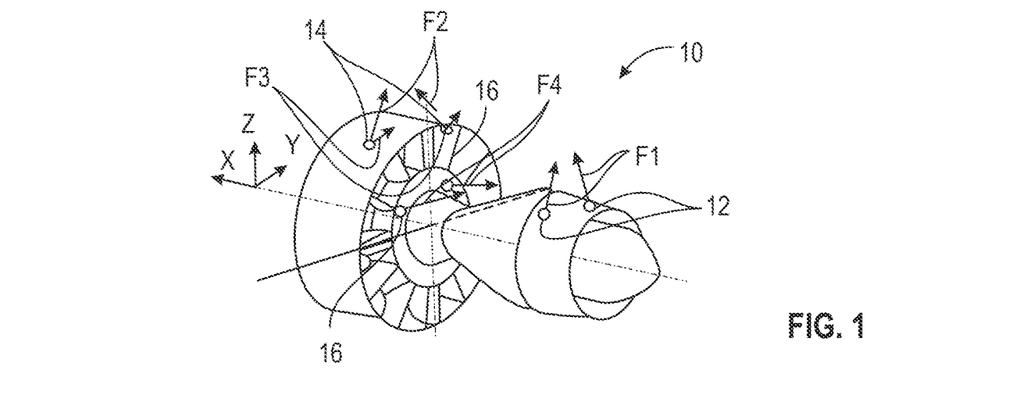
FIG. 1, already described, is a very schematic perspective view of a turbomachine equipped with suspensions, according to the prior art.

The turbomachine is hooked under the wing of the aircraft by suspensions. As shown in FIG. 1, representing a turbomachine 10 extending longitudinally along an axis X, transversely along an axis Y, and vertically along an axis Z, the turbomachine is hooked by:
- at the rear (i.e. downstream) of the engine, a suspension 12 on the exhaust casing of the engine, which takes up two degrees of freedom (along the axes Y and Z, represented by the arrows F1),
- at the front (i.e. upstream) of the engine, a suspension 14 which takes up the four remaining degrees of freedom (along the axes Y and Z, represented by the arrows F2, and taking up the engine torques along the axes X and Y, represented by the arrows F3), and
- two connecting rods 16 for taking up the thrust of the engine, which take up only one degree of freedom (along the axis X, represented by the arrows F4).

However, the hooking suspensions of the engine are not completely aligned with the thrust of the latter, which generates significant vertical loads. This results in a bending moment of the engine shaft and the casings surrounding the latter, and consequently in internal operating clearances of the engine, which penalizes the efficiency of the latter.

This deformation can also be accentuated by the expansion of the engine, which lengthens with the increase of the operating temperature, while the aircraft pylon remains at iso-length (along the axis X).

Various methods to mitigate this bending have been implemented, such as varying the angles of the thrust-reacting connecting rods to minimize the vertical forces on the rear suspension due to the thrust of the engine.

The French patent application FR 3 058 127 A1 describes an assembly between an aircraft structural pylon and an aircraft turbomachine, which comprises a beam attached to the turbomachine and in which a ball joint is mounted. The beam comprises suspension ears, each comprising a bore for the passage of an axle. The axle also passes through a bore in the pylon to connect the beam to the pylon. A plot secured to the pylon cooperates with the ball joint of the beam. At the level of a rear suspension, the beam has an oblong orifice extending along the longitudinal axis X of the turbomachine, and in which a finger secured to the pylon is engaged with a clearance. This oblong orifice is intended to be fully consumed in a fail-safe situation to transmit the thrust (along the axis X), and also allows the engine to expand (along the axis X), before the clearance is fully consumed.

The French patent application FR 3 015 434 A1 describes a suspension of an aircraft engine to a supporting structure of this aircraft. The rear suspension comprises two uprights forming a clevis and being connected to each other by a slide on which a roller is freely mounted and slides between the uprights forming stops, while rolling in an oblong slot (extending along a transverse axis Y) in an ear of the exhaust casing of the engine. This rear suspension allows to respond in particular to the problem of thermal expansion. An elongation along the longitudinal axis X of the engine (i.e. an expansion) and a rotation about the axis X (i.e. a torque) are allowed, but the engine cannot displace along the vertical axis Z in the rear area of the engine. This has the effect of constraining the engine axle, which will fold in the casings surrounding the engine (via the bearings supporting the engine axle), which are themselves blocked along the axis Z. An operating clearance between the engine axle and the casings is thus provided, which is detrimental to the performance of the engine.

The objective of the invention is to propose a solution that allows the aircraft engine to expand axially and deform vertically, without exerting constraints on the surrounding casings, and thus to allow to reduce the internal operating clearances of the engine, and thus to improve the efficiency of the engine.

SUMMARY OF THE INVENTION

To this end, the invention relates to an assembly between an aircraft pylon and a turbomachine of longitudinal axis X, the pylon and the turbomachine each comprising front and rear longitudinal areas, the assembly comprising a rear support configured to connect the rear area of the turbomachine to the rear area of the pylon, the assembly being characterised in that the rear support comprises a sliding pivot connection arranged between the rear area of the turbomachine and the rear area of the pylon so as to allow the turbomachine only translational and rotational movements along the longitudinal axis X and translational and rotational movements along a vertical axis Z and a rotational movement along a transverse axis Y.

According to the invention, the rear support reacts only to forces in the lateral direction Y. The rear support according to the invention thus allows to block a translational movement of the engine along the transverse axis Y.

The rear support, which is hooked to the aircraft pylon, transmits the thrust (along the longitudinal axis X), and also acts as a lateral stop for the rear area of the engine.

Advantageously, the invention allows the engine to expand axially and deform vertically, without exerting constraints on the surrounding casings, and thus limits the deformation with respect to internal rotating parts.

Advantageously, the invention allows for constraints-free movements of the stator and of the rotor of the engine, thereby allowing to reduce internal operating clearances and improving the efficiency of the engine.

The rear area of the turbomachine comprises an exhaust casing. The sliding pivot connection is arranged between the exhaust casing and the aircraft pylon, in order to let the engine deform (by thrust and flight constraints) and expand (by temperature).

In the following description, the terms "turbomachine" and "engine" are used interchangeably to refer to the turbomachine.

According to one embodiment, the turbomachine comprises a smooth axle extending along the longitudinal axis X, and the pylon has a slot oriented along the vertical axis Z.

The sliding pivot connection is formed by the smooth axle of the turbomachine which is configured to slide in the slot of the pylon. The smooth axle can be linked to a turbine of the turbomachine.

According to another embodiment, the pylon comprises a smooth axle extending along the longitudinal axis X, and the turbomachine has a slot oriented along the vertical axis Z. The sliding pivot connection is formed by the smooth axle of the pylon which is configured to slide in the slot of the turbomachine. The slot can be formed in a turbine of the turbomachine.

The slot of the turbomachine or of the pylon can be rectangular or oblong.

The slot is oriented along the vertical axis Z, in order to leave free the vertical movements of the engine (translation and rotation), and to block only the translation movement along the transverse axis Y. The shape of the oblong slot allows a lateral blocking along the axis Y, but authorizes a rotation and translation of the engine along the axes X and Z.

The slot is arranged so that its dimension along the vertical axis Z is larger than its dimension along the transverse axis Y. The shape of the slot allows to have a contact between the smooth axle and the slot along the transverse axis Y.

The assembly may comprise mechanical stops arranged at the ends of the smooth axle of the turbomachine or of the pylon. These stops are configured to limit the displacement of the turbomachine along the vertical axis Z.

The mechanical stops are needed to limit the displacements of the engine during exceptional load cases, such as a loss of vanes, a hard landing, or a belly landing of the aircraft.

Advantageously, the mechanical stops are configured to avoid any unhooking of the assembly.

The assembly may comprise elastic means configured to exert a force along the transverse axis Y on the smooth axle of the turbomachine or of the pylon. The elastic means can be of the pusher or rotary type. The elastic means may comprise a return spring that constantly exerts a force along the transverse axis Y, so as to limit the clearance between the smooth axle and the vertical walls of the slot.

These elastic means form an automatic clearance adjustment system, to avoid the parasitic movements of the smooth axle along the transverse axis Y and to allow an angular displacement about the transverse axis Y of the latter.

Advantageously, the clearances required for the displacements and to the deformations of the engine are calculated to avoid any unhooking of the assembly.

In order to promote a safe-life, and to avoid a failure of the rear support, the smooth axle may comprise at least two concentric tubes, each tube being configured to hold limit loads.

To promote a fail safe, the smooth axle can be configured to hold ultimate loads, and to retain its original capabilities throughout the service life of the aircraft.

The assembly may also comprise a front support configured to connect the front area of the turbomachine to the front area of the pylon. The front support comprises first suspension clevises extending along the transverse axis Y and the vertical axis Z, and first links extending along the transverse axis Y and the vertical axis Z, and forming an articulated connection with the first suspension clevises, the first links being inserted into the first suspension clevises and passed through by first axles extending along the longitudinal axis X.

In order to promote a fail safe, the front support may also comprise second suspension clevises extending along the longitudinal axis X and the vertical axis Z, and second links extending along the longitudinal axis X and the vertical axis Z, and forming an articulated connection with the second suspension clevises, the second links being inserted into the second suspension clevises and traversed by second axles extending along the transverse axis Y.

The front area of the turbomachine comprises an intermediate casing. Thus, according to the invention, the turbomachine is suspended by its intermediate casing, at the top portion, by means of a front support attached to the aircraft pylon, and a rear support attached to a rear area of the pylon (there is no hooking of the engine at the rear).

The front support can be hooked to the intermediate casing, or to an intermediate casing ferrule (VCI), or to the root of the Outlet Guide Vane (OGV). Preferably, the turbomachine is suspended by its intermediate casing, or by a VCI, in the front area of the engine, so as to eliminate all degrees of freedom at this interface.

The front support reacts to forces along the longitudinal axis X, the transverse axis Y and the vertical axis Z, and to moments (torques) of axis X and Z.

When the front support is configured to take up the thrust (along the longitudinal axis X), the front support may comprise a thrust-reacting system consisting of a rudder and two connecting rods.

Alternatively, the front support may comprise a thrust-reacting system consisting of a pin extending along the vertical axis Z and circulating in an oblong slot extending along the transverse axis Y.

The assembly may also comprise two connecting rods configured to connect the front area of the turbomachine to the rear support.

According to the invention, the thrust exerted by the engine (force along the longitudinal axis X) is taken up by the two connecting rods (also referred to as thrust-reacting connecting rods) between the intermediate casing of the turbomachine and the pylon in the rear area, and by a point on the front support between the intermediate casing in the front area and the pylon, and transmitted to the aircraft via the rear support. Thus, the rear support takes over the thrust of the engine via the thrust-reacting connecting rods.

According to the invention, the thrust is not taken up by the slot oriented along the vertical axis Z, but is taken up by the front suspension.

The size of the slot allows the body of the engine to bend freely ("backbone bending"), and allows to reduce the operating clearances.

The maximum dimension of the slot (limited by the mechanical stops) creates a vertical contact, and allows to limit the constraints in case of important punctual efforts, such as during shocks, or a hard landing.

According to the invention, there is no force absorption along the vertical axis Z by the slot, which allows an engine displacement along the longitudinal axis X and along the vertical axis Z (limited by the dimensions of the slot and the mechanical stops), but also a rotation along the axes X and Z. This advantageously allows the casings of the engine and the engine axle to expand freely and to deform or bend without constraints.

The invention also relates to a propulsion assembly of an aircraft comprising a turbomachine of longitudinal axis X, the turbomachine comprising front and rear longitudinal areas, the propulsion assembly also comprising an assembly according to the invention and a cover arranged around the turbomachine, the cover being secured to the turbomachine so that a movement of the turbomachine causes a movement of the cover.

In other words, the cover is secured to the turbomachine so that a translational and/or rotational movement along the longitudinal axis X and/or along the vertical axis Z and/or a rotational movement along the transverse axis Y of the turbomachine results in the same translational and/or rotational movement of the cover.

The propulsion assembly thus comprises the engine, as well as the nacelle which surrounds it, and thus the various covers arranged around the engine.

The invention also relates to an aircraft comprising an assembly according to the invention.

The invention also relates to an aircraft comprising a propulsion assembly according to the invention.

BRIEF DESCRIPTION OF FIGURES

The invention will be better understood and other details, characteristics and advantages of the present invention will become clearer from the following description made by way of non-limiting example and with reference to the attached drawings, in which.

The elements having the same functions in the different embodiments have the same references in the figures.

DESCRIPTION OF THE EMBODIMENTS

Figure 2:
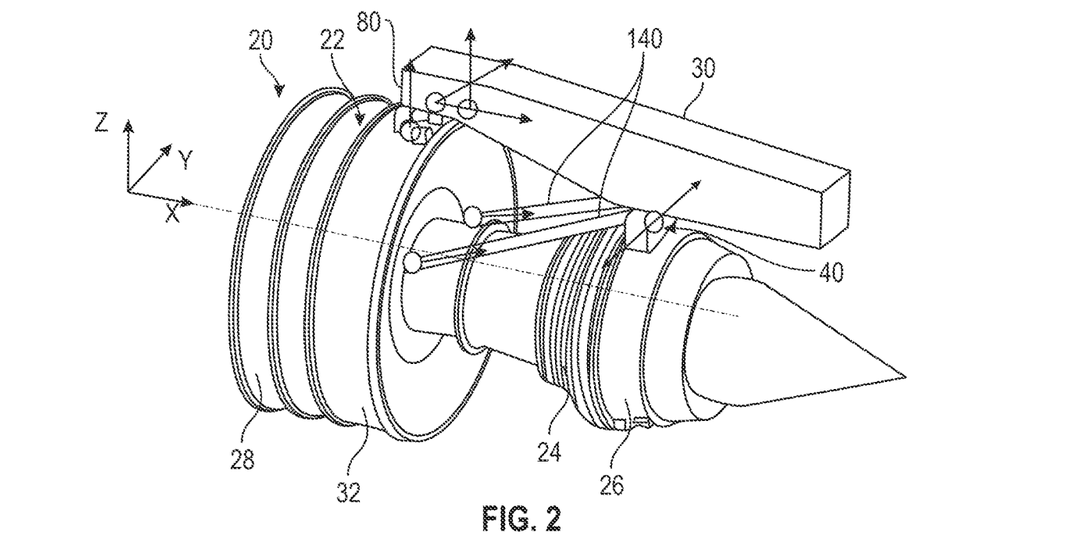
FIG. 2 is a very schematic perspective view of a turbomachine hooked to an aircraft pylon by an assembly according to the invention.
Figure 3:
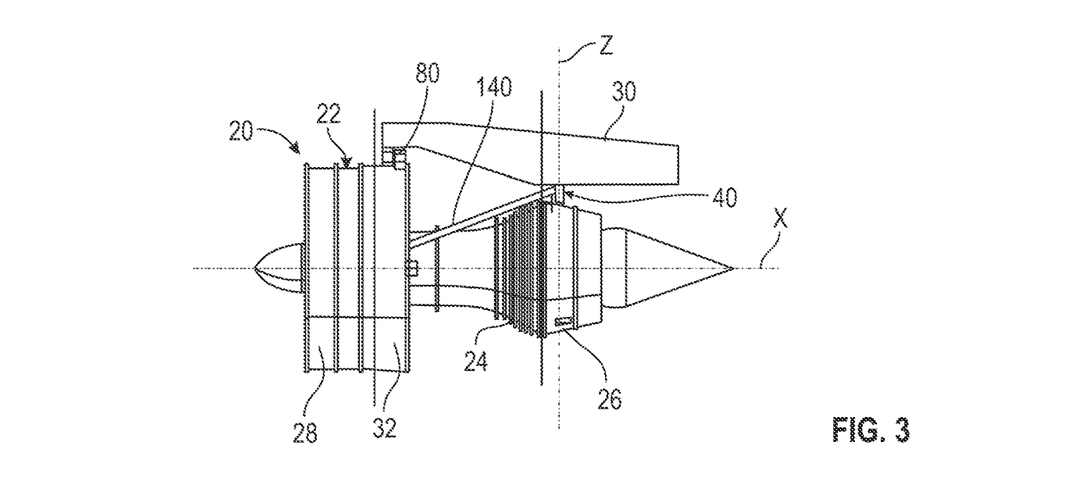
FIG. 3 is a very schematic side view of a turbomachine hooked to an aircraft pylon by an assembly according to the invention.

As shown in FIGS. 2 and 3, a turbomachine 20 is suspended from a pylon 30, under a wing of the aircraft. The turbomachine 20 extends longitudinally along an axis X, transversely along an axis Y, and vertically along an axis Z. The pylon 30 extends longitudinally along the axis X. The pylon 30 and the turbomachine 20 each comprise a front longitudinal area and a rear longitudinal area, in the direction of flow of the gases (along the axis X).

The turbomachine can be a turboshaft engine, a turbojet engine or a turboprop engine. The turbomachine may comprise, from upstream to downstream in the flow direction of the gases, a fan surrounded by a casing of fan 22, at least one compressor, a combustion chamber, and at least one turbine surrounded by a casing of turbine 24. An exhaust casing 26 is arranged downstream of the turbine. The fan casing 22 comprises an upstream casing 28 surrounding the fan about the axis X and an intermediate casing 32 located in axial extension of the upstream casing 28.

The pylon 30 attached to the body of the turbomachine 20, for example at the level of its intermediate casing 32. A pylon is a rigid, substantially parallelepipedal, non-deformable element.

An assembly between the pylon 30 and the turbomachine 20 comprises a rear support 40 configured to connect the rear area of the turbomachine 20 to the rear area of the pylon 30. The rear support 40 comprises a sliding pivot connection arranged between the rear area of the turbomachine 20 and the rear area of the pylon 30 so as to allow the turbomachine 20 only translational and rotational movements along the axes X and Z, and a rotational movement along the axis Y. The sliding pivot connection is arranged to block a translational movement of the turbomachine 20 along the axis Y.

The sliding pivot connection is arranged between the exhaust casing 26 and the pylon 30, in order to let the turbomachine 20 deform and expand. The turbomachine 20 can thus expand axially along the axis X and deform vertically along the axis Z, without exerting constraints on the casings 22, 24, 26 that surround it.

Figure 4:
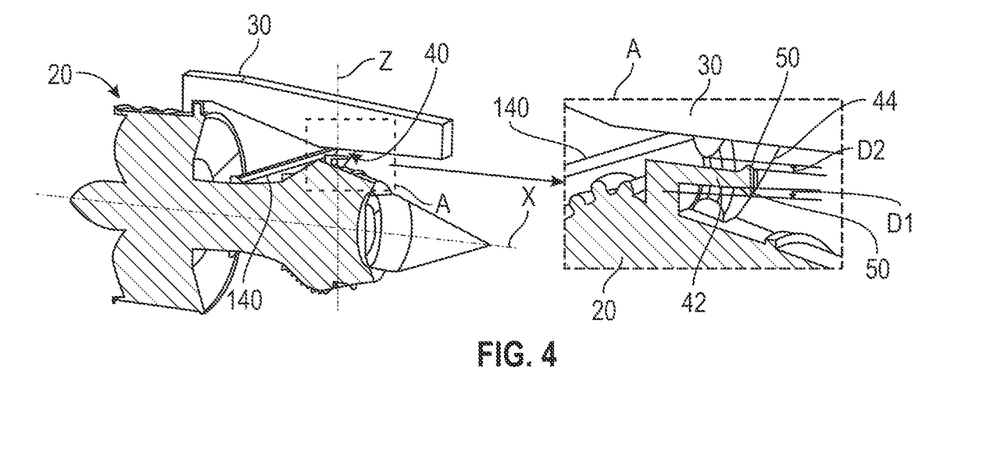
FIG. 4 is a very schematic cross-sectional view of a turbomachine hooked to an aircraft pylon by an assembly according to the invention.

According to a first embodiment shown in FIG. 4, the turbomachine 20 may comprise a smooth axle 42 (in particular visible in the box A, which represents an enlarged view of the segment circled in dotted lines in FIG. 4) extending along the axis X, and the pylon 30 may have a slot 44 oriented along the axis Z. The sliding pivot connection of the rear support 40 may be formed by the smooth axle 42 of the turbomachine 20 that is configured to slide within the slot 44 of the pylon 30.

The smooth axle 42 may be connected to the turbine of the turbomachine 20. The smooth axle 42 has a generally cylindrical shape with a circular base. The smooth axle 42 is a pin, which is connected at one of its ends to the turbomachine 20, and is free at its other end.

To promote a safe-life, the smooth axle 42 may comprise two concentric tubes, with a first tube housed within a second tube, each tube configured to hold limit loads.

To promote a fail safe, the smooth axle 42 can be configured to hold ultimate loads, and to retain its original capabilities throughout the service life of the aircraft.

The slot 44 has a general rectangular or oblong shape. The slot 44 is arranged so that its dimension along the axis Z is larger than its dimension along the axis Y. The slot is oriented along the axis Z, so as to leave the vertical movements of the turbomachine 20 free, and to block only the translational movement along the axis Y. The shape of the slot 44 allows a contact between the smooth axle 42 and the slot 44 along the axis Y. Thus, the slot 44 allows a lateral blocking along the axis Y, but authorizes a rotation and translation of the turbomachine 20 along the axes X and Z.

According to a second embodiment not shown, the pylon 30 comprises the smooth axle extending along the axis X, and the turbomachine 20 has a slot oriented along the axis Z. In this embodiment, the sliding pivot connection is formed by the smooth axle of the pylon 30 which is configured to slide within the slot of the turbomachine 20. The same characteristics as those presented for the first embodiment are of course applicable to this second embodiment.

As shown in the box A of FIG. 4, the assembly may comprise mechanical stops 50 arranged at the ends of the smooth axle 42. These mechanical stops 50 are configured to limit the displacement of the turbomachine 20 along the axis Z. The arrows D1 and D2 represent the displacement/deformation clearances of the turbomachine 20 along the axis Z.

The mechanical stops 50 are configured to prevent the assembly from unhooking.

Figure 5:
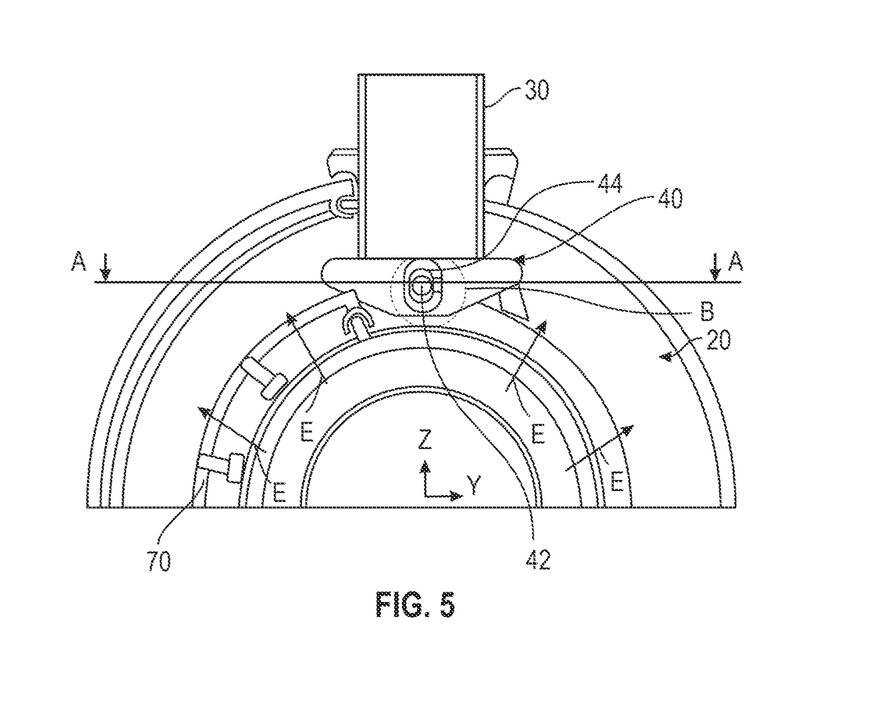
FIG. 5 is a very schematic rear view along the axis X (engine axle) of a rear portion of a turbomachine hooked to an aircraft pylon by an assembly according to the invention.
Figure 6:
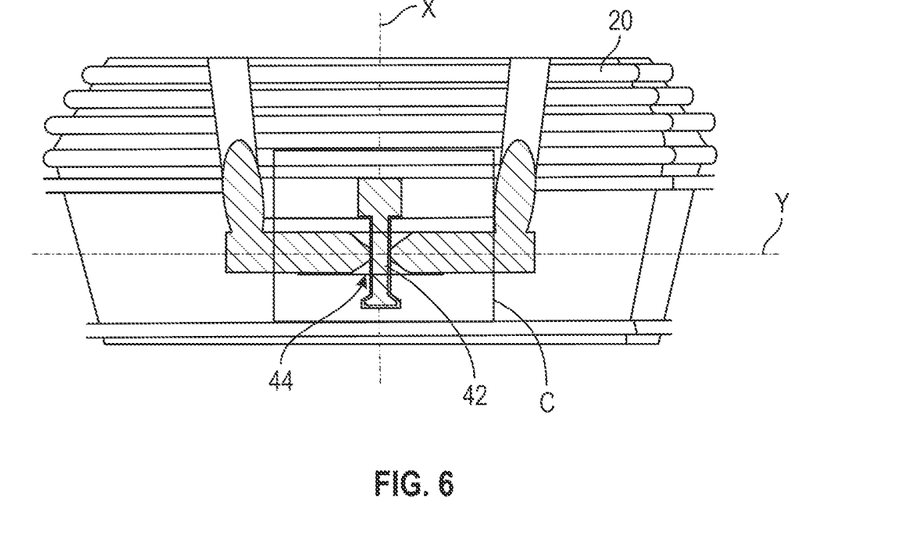
FIG. 6 is a very schematic view of cross-section A-A of FIG. 5.

FIG. 5 shows a front view of the turbomachine 20 comprising the smooth axle 42, the pylon 30 having the slot 44 and the assembly according to the invention. FIG. 6 shows a cross-section A-A of FIG. 5.

The assembly may comprise elastic means 60 configured to exert a force along the axis Y on the smooth axle 42. The elastic means 60 form an automatic clearance adjustment system, to avoid the parasitic movements of the smooth axle 42 along the axis Y and to allow an angular displacement about the axis Y of the latter.

Figure 7:
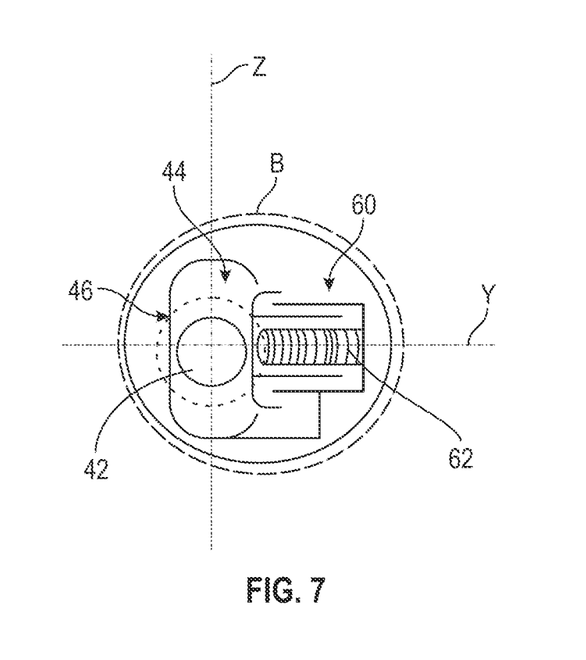
FIG. 7 is a very schematic front view of an automatic clearance adjustment system, of the pusher type.
Figure 8:
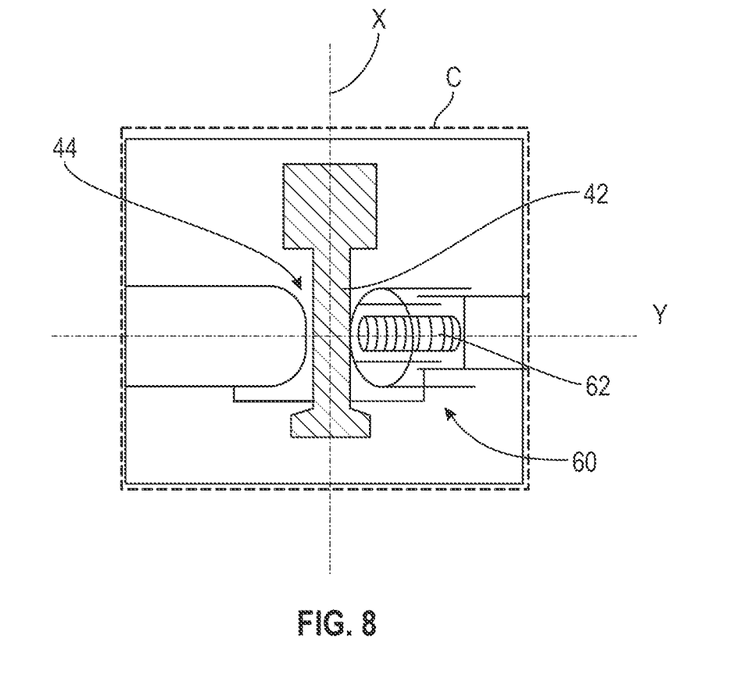
FIG. 8 is a very schematic cross-sectional view of an automatic clearance adjustment system, of the pusher type.

As shown in FIG. 7, which is an enlarged view of a first embodiment of the box B in FIG. 5, and FIG. 8, which is an enlarged view of the box C in FIG. 6, the elastic means 60 may be of the pusher type. The elastic means 60 may comprise a return spring 62 extending along the axis Y and being configured to exert a force along the axis Y, so as to limit the clearance between the smooth axle 42 and the vertical walls 46 of the slot 44.

Figure 9:
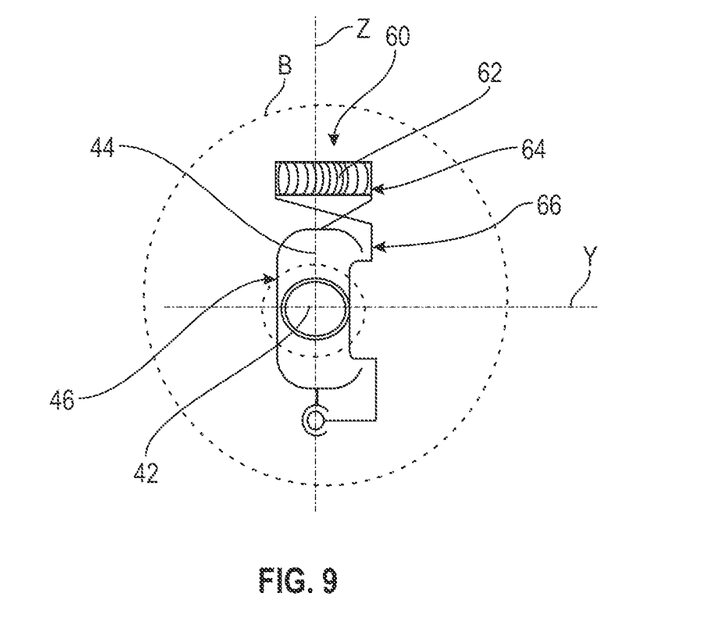
FIG. 9 is a very schematic front view of an automatic clearance adjustment system, of the rotary type.
Figure 10:
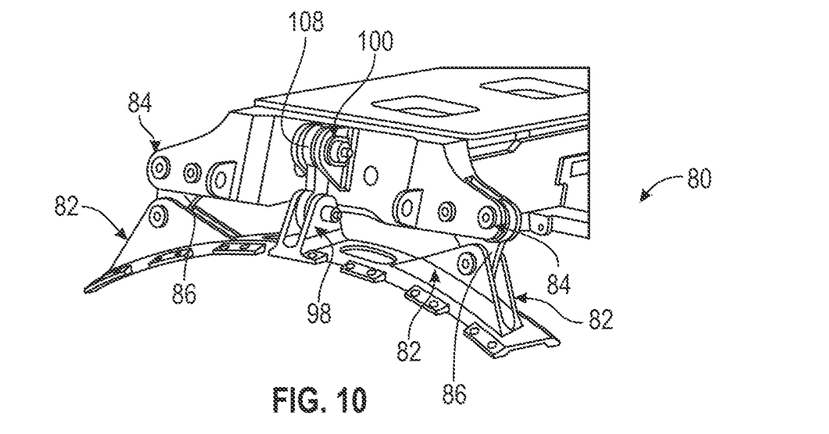
FIG. 10 is a very schematic perspective view of a front support of an assembly according to a first embodiment of the invention.
Figure 11:
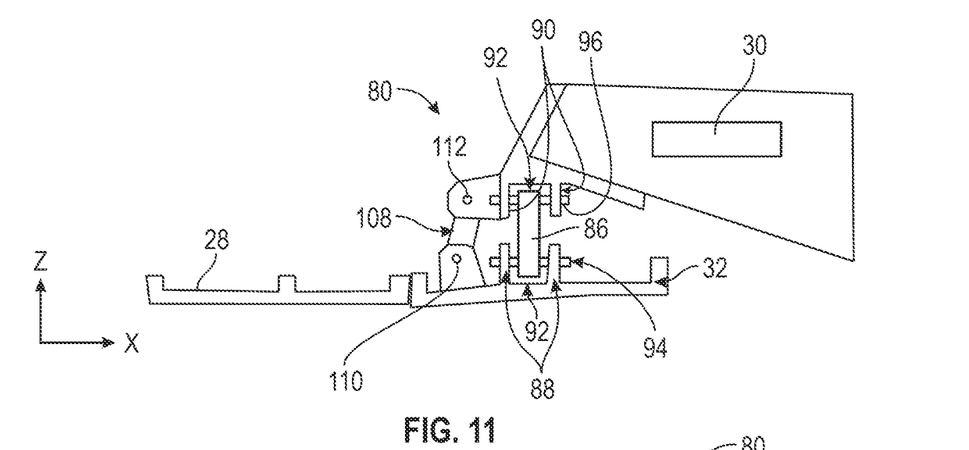
FIG. 11 is a very schematic side view of a front portion of a turbomachine hooked to an aircraft pylon by an assembly according to the first embodiment of the invention.
Figure 12:
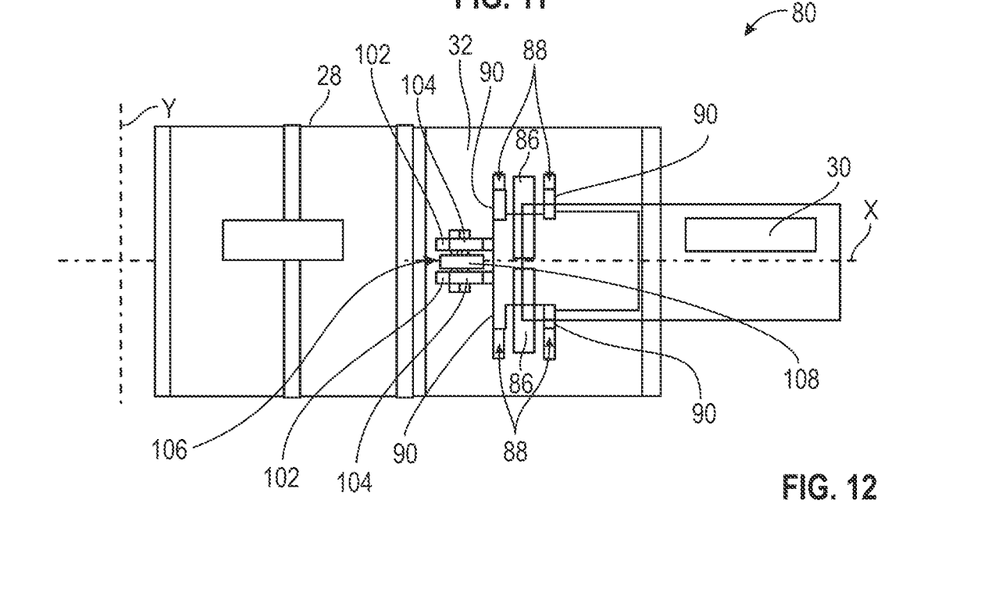
FIG. 12 is a very schematic top view of a front portion of a turbomachine hooked to an aircraft pylon by an assembly according to the first embodiment of the invention.

As shown in FIG. 9, which is an enlarged view of a second embodiment of the box B in FIG. 5, the elastic means 60 may be of the rotary type. The elastic means 60 may comprise a return spring 62 extending along the axis Y and being configured to exert a force along the axis Y, so as to limit the clearance between the smooth axle 42 and the vertical walls 46 of the slot 44. The return spring 62 may be arranged above the slot 44, and connected at one of its ends to a stop 64 and at the other end to a plate 66 that transmits the force of the return spring 62 along the axis Y to the smooth axle 42.

The automatic clearance adjustment system is configured to prevent the assembly from unhooking.

As shown in FIG. 5, a cover 70 is securely arranged around the turbomachine 20. In particular, the cover 70 is not hooked to the pylon 30. A translational movement along the axes X or Z or a rotational movement along the axes X, Y or Z of the turbomachine 20 results in an identical movement of the cover 70. In other words, when the turbomachine 20 deforms, and therefore displaces (in the direction of the arrows E in FIG. 5), it causes the cover 70 to displace with its movement.

The assembly may also comprise a front support 80 configured to connect the front area of the turbomachine 20 to the front area of the pylon 30.

As shown in FIGS. 10 to 18, the front support 80 comprises first suspension clevises 82, 84. A suspension clevis 82, 84 is composed of two vertical uprights 88, 90, which extend in a plane containing the axes Y and Z. The vertical uprights 88, 90 are joined in pairs, along the axis X, so that an axial space 92 between the two vertical uprights 88, 90 is formed.

The front support 80 comprises first links 86 forming articulated connections with the suspension clevises 82, 84. The links 86 extend in a plane containing the axes Y and Z. The links 86 are inserted into the suspension clevises 82, 84, and more specifically into the space 92 between the two vertical uprights 88, 90 of a suspension clevis 82, 84. The links 86 have axles 94, 96 extending through them along the axis X.

The suspension clevises 82 are connected to the intermediate casing 32 of the turbomachine 20, while the suspension clevises 84 are connected to the pylon 30. The axles 94 connect the links 86 to the suspension clevises 82 of the turbomachine 20 and the axles 96 connect the links 86 to the suspension clevises 84 of the pylon 30.

In order to promote a fail safe, the front support 80 comprises second suspension clevises 98, 100. A suspension clevis 98, 100 is composed of two vertical uprights 102, 104, which extend in a plane containing the axes X and Z. The vertical uprights 102, 104 are joined in pairs, along the axis Y, so that an axial space 106 between the two vertical uprights 102, 104 is formed.

The front support 80 comprises second links 108 that form articulated connections with the suspension clevises 98, 100. The links 108 extend in a plane containing the axes X and Z. The links 108 are inserted into the suspension clevises 98, 100, and more specifically into the space 106 between the two vertical uprights 102, 104 of a suspension clevis 98, 100. The links 108 have axles 110, 112 extending through them along the axis Y.

The suspension clevis 98 is connected to the intermediate casing 32 of the turbomachine 20, while the suspension clevis 100 is connected to the pylon 30. The axle 110 connects the link 108 to the suspension clevis 98 of the turbomachine 20, and the axle 112 connects the link 108 to the suspension clevis 100 of the pylon 30.

The turbomachine 20 is thus suspended by its intermediate casing 32, at the top portion, by means of the front support 80 which is attached to the pylon 30, so as to eliminate all degrees of freedom at this interface. The front support 80 can also be hooked on a VCI, or at the root of an OGV.

The front support 80 reacts to forces in the axes X, Y and Z and to moments of axis X and Z.

The front support 80 can be configured to take up the thrust (along the axis X).

Figure 13:
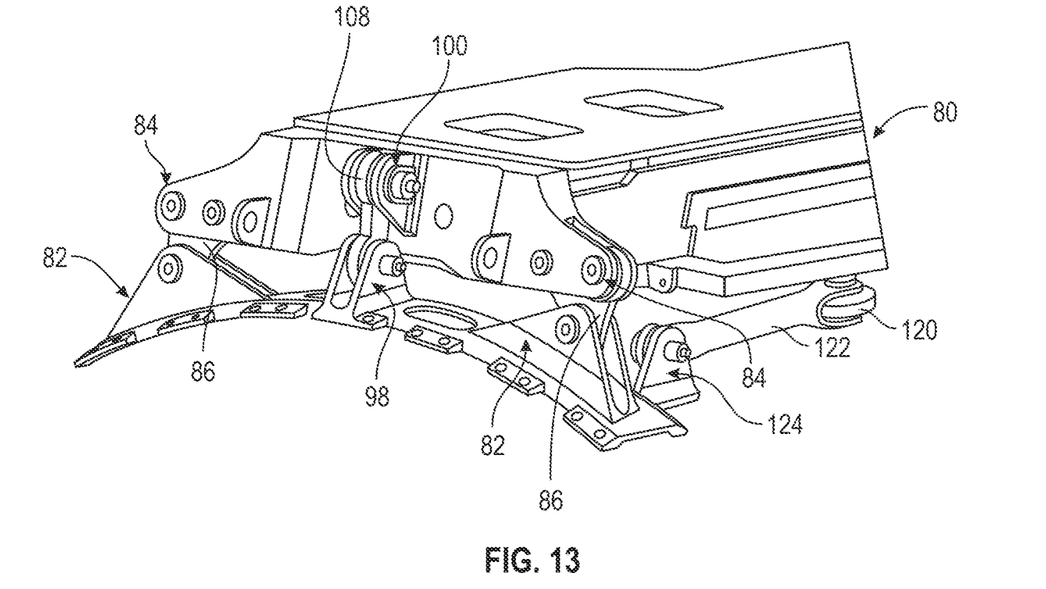
FIG. 13 is a very schematic perspective view of a front support of an assembly according to a second embodiment of the invention.
Figure 14:
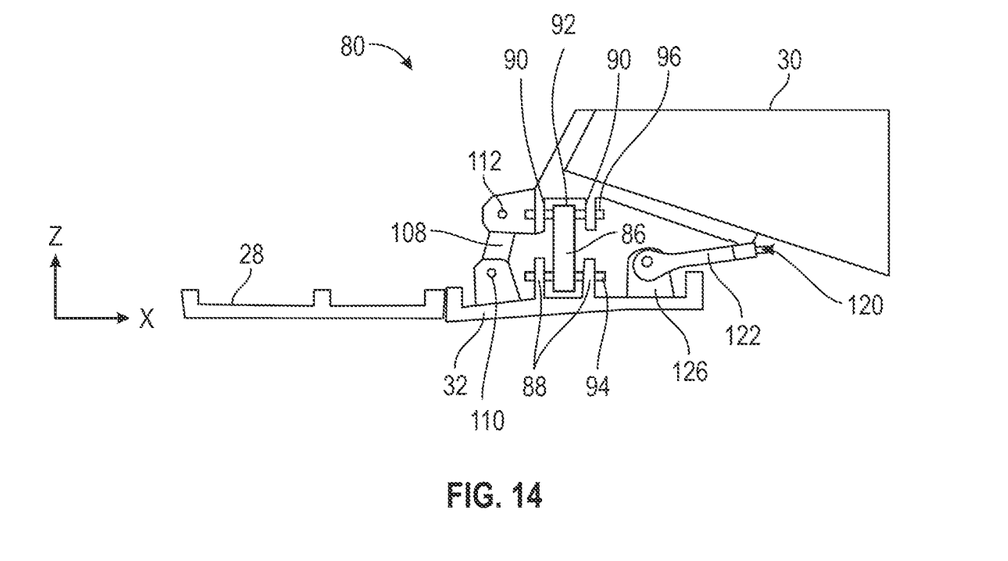
FIG. 14 is a very schematic side view of a front portion of a turbomachine hooked to an aircraft pylon by an assembly according to the second embodiment of the invention.
Figure 15:
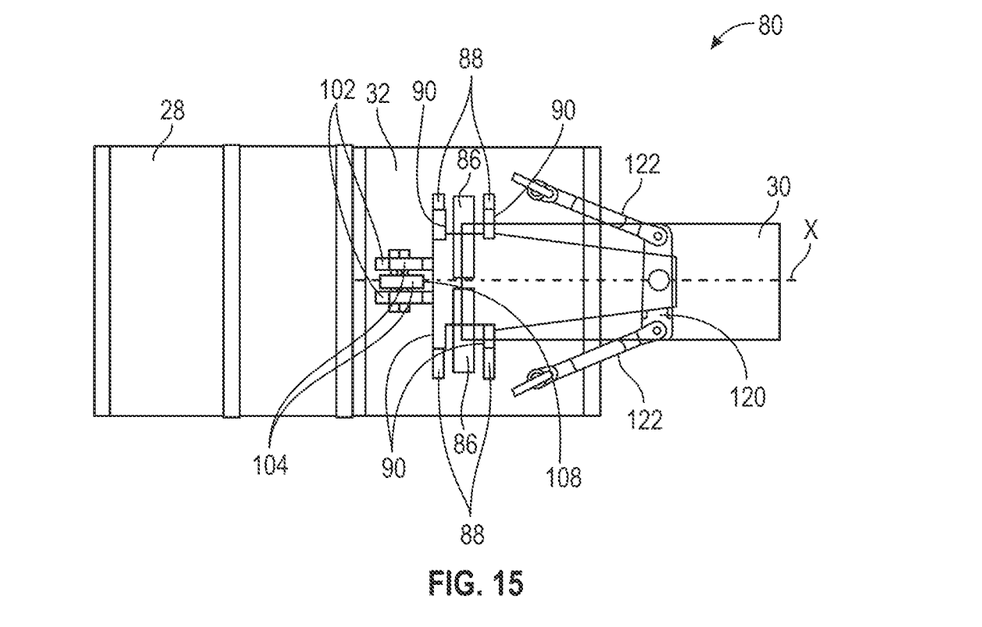
FIG. 15 is a very schematic top view of a front portion of a turbomachine hooked to an aircraft pylon by an assembly according to the second embodiment of the invention.

As shown in FIGS. 13 to 15, the front support 80 may further comprise a thrust-reacting system consisting of a rudder 120 and two connecting rods 122. The connecting rods 122 are hooked, via a suspension clevis 124 consisting of a vertical upright 126, which extends in a plane containing the axes X and Z, at one end to the turbomachine 20, and at the other end to the rudder 120, which is hooked to the pylon 30.

Figure 16:
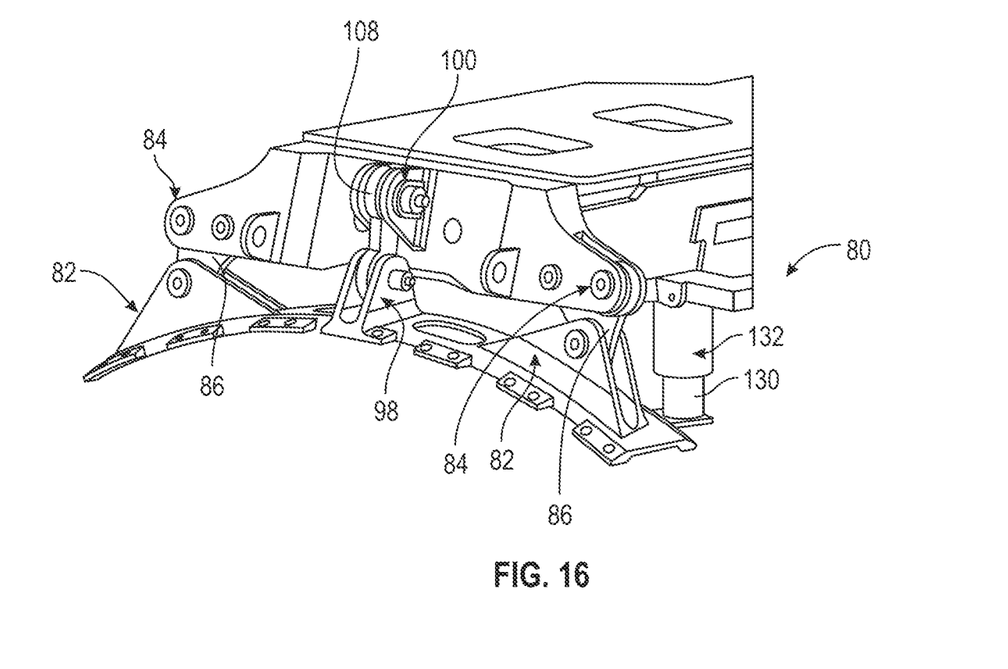
FIG. 16 is a very schematic perspective view of a front support of an assembly according to a third embodiment of the invention.
Figure 17:
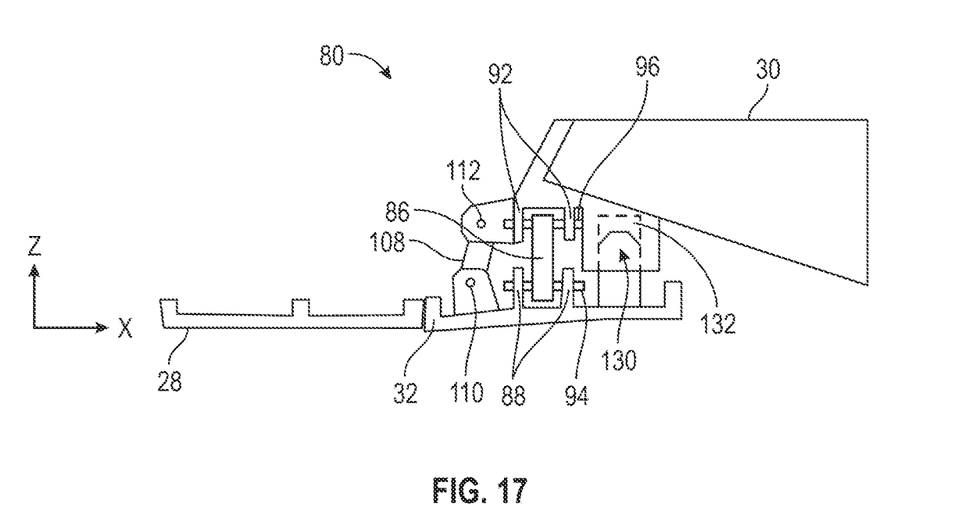
FIG. 17 is a very schematic side view of a front portion of a turbomachine hooked to an aircraft pylon by means of an assembly according to the third embodiment of the invention.
Figure 18:
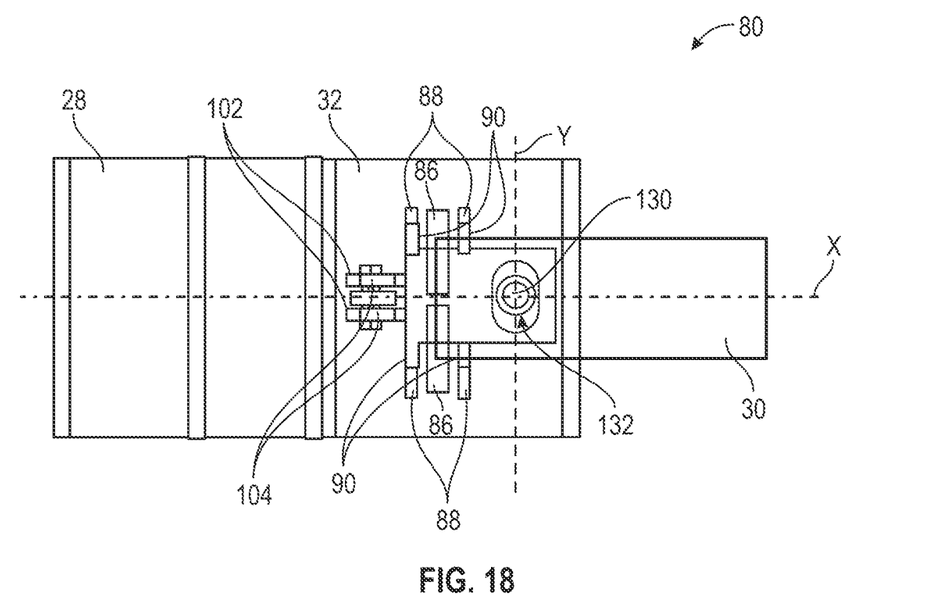
FIG. 18 is a very schematic top view of a front portion of a turbomachine hooked to an aircraft pylon by an assembly according to the third embodiment of the invention.

As shown in FIGS. 16 to 18, the front support 80 may further comprise a thrust-reacting system consisting of a pin 130 extending along the axis Z and circulating through an oblong slot 132 extending along the axis Y. The pin 130 is hooked to the turbomachine 20, and the elongated slot 132 is formed in the pylon 30.

As shown in FIGS. 2 to 4, the assembly may also comprise two connecting rods 140 configured to connect the front area of the turbomachine 20 to the rear support 40. The connecting rods 140 allow the thrust to be taken up between the intermediate casing 32 and the pylon 30 in the rear area. The thrust is then transmitted to the aircraft by the rear support 40.

The invention claimed is:

1. An assembly between an aircraft pylon and a turbomachine of longitudinal axis, the pylon and the turbomachine each comprising front and rear longitudinal areas, the assembly comprising a rear support configured to connect the rear area of the turbomachine to the rear area of the pylon the assembly being characterised in that the rear support comprises a sliding pivot connection arranged between the rear area of the turbomachine and the rear area of the pylon so as to allow the turbomachine only translational and rotational movements along the longitudinal axis and translational and rotational movements along a vertical axis and a rotational movement along a transverse axis.

2. The assembly of claim 1, wherein the turbomachine comprises a smooth axle extending along the longitudinal axis, and the pylon has a slot oriented along the vertical axis, and wherein the sliding pivot connection is formed by the smooth axle of the turbomachine being configured to slide in the slot of the pylon.

3. The assembly of claim 1, wherein the pylon comprises a smooth axle extending along the longitudinal axis, and the turbomachine has a slot oriented along the vertical axis, and wherein the sliding pivot connection is formed by the smooth axle of the pylon being configured to slide in the slot of the turbomachine.

4. The assembly of claim 2, wherein the slot of the turbomachine or of the pylon is rectangular or oblong in shape.

5. The assembly according to claim 2, comprising mechanical stops arranged at the ends of the smooth axle of the turbomachine or of the pylon.

6. The assembly according to claim 2, comprising elastic means configured to exert a force along the transverse axis on the smooth axle of the turbomachine or of the pylon.

7. The assembly of claim 2, wherein the smooth axle comprises at least two concentric tubes.

8. The assembly according to claim 1, comprising a front support configured to connect the front area of the turbomachine to the front area of the pylon, the front support comprising suspension devises extending along the transverse axis and the vertical axis, and links extending along the transverse axis and the vertical axis and forming an articulated connection with the suspension devises, the links being inserted into the suspension devises and passed through by axles extending along the longitudinal axis.

9. A propulsion assembly for an aircraft comprising a turbomachine of longitudinal axis, the turbomachine comprising front and rear longitudinal areas, the propulsion assembly also comprising an assembly according to claim 1 and a cover arranged around the turbomachine, the cover being secured to the turbomachine so that a movement of the turbomachine causes a movement of the cover.

10. An aircraft comprising an assembly according to claim 1.

11. An aircraft comprising a propulsion assembly according to claim 9.

* * * * *